Dec. 11, 1962    K. GEBELE ETAL    3,067,665
PHOTOGRAPHIC CAMERA
Filed Feb. 23, 1960    4 Sheets-Sheet 1
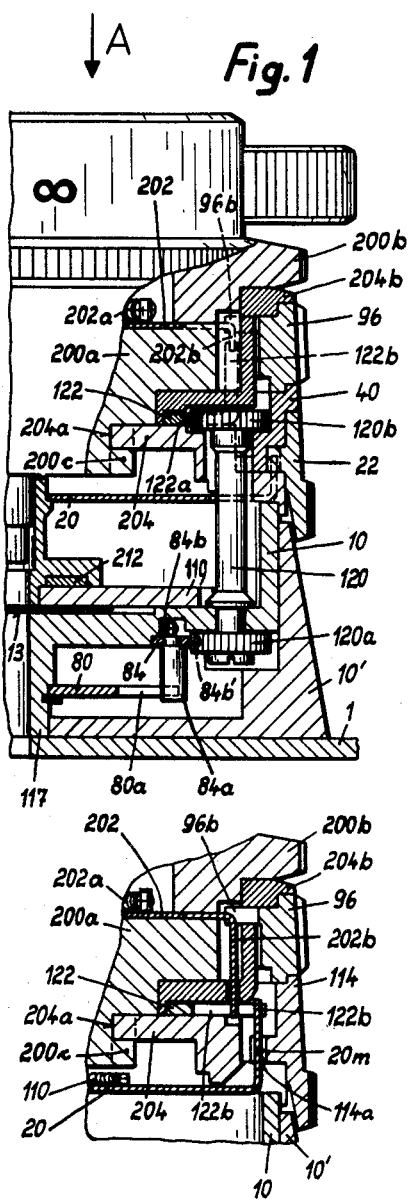
Fig. 1
Fig. 2
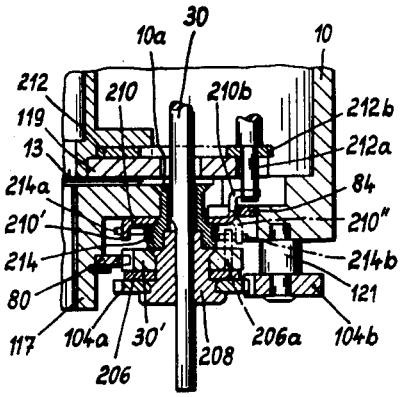
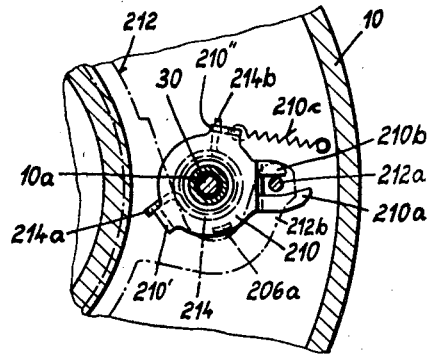
Fig. 4    Fig. 3

Dec. 11, 1962 K. GEBELE ETAL 3,067,665
PHOTOGRAPHIC CAMERA
Filed Feb. 23, 1960 4 Sheets-Sheet 2

Dec. 11, 1962     K. GEBELE ETAL     3,067,665
PHOTOGRAPHIC CAMERA
Filed Feb. 23, 1960     4 Sheets-Sheet 4

United States Patent Office 3,067,665
Patented Dec. 11, 1962

3,067,665
PHOTOGRAPHIC CAMERA
Kurt Gebele, and Franz Singer, Munich, Germany, assignors to Compur-Werk G.m.b.H. & Co., Munich, Germany, a firm of Germany
Filed Feb. 23, 1960, Ser. No. 10,385
Claims priority, application Germany Feb. 27, 1959
7 Claims. (Cl. 95—64)

The present invention relates to a photographic camera of the type having a diaphragm aperture which may be set automatically in accordance with an exposure value indication, and especially but not exclusively to a camera of the foregoing type having an interchangeable objective embodying a built-in diaphragm device.

An object of the invention is to provide a camera which calls for a minimum of thought on the part of the user in adjusting the camera to the factors which govern exposure and in manipulating the same, and which at the same time is of the utmost compactness through insuring absolute dependability in the functional interplay between the various mechanisms incorporated therein.

Another object is the provision of a new and improved photographic camera including an interchangeable objective having a diaphragm device which may be set from the camera either automatically or, if desired, manually.

Yet another object is to provide a new and improved photographic shutter assembly including a built-in diaphragm to be used on a single lens reflex type of camera wherein the shutter blades and diaphragm leaves are opened for viewing before the exposure, the shutter blades being closed and the diaphragm being returned to a preselected stop before taking the picture.

A further object is the provision in a single lens reflex type camera of an interchangeable objective having a diaphragm to be set automatically in accordance with an exposure value indication or also manually, the diaphragm remaining in the maximum aperture position for viewing while the shutter blades are open for viewing before making the exposure.

A still further object is to provide a camera of the foregoing type wherein the shutter speed may also be automatically or manually set.

These and other desirable objects may be attained in the manner disclosed as an illustrative embodiment of the invention in the following description and in the accompanying drawings forming a part hereof, in which:

FIG. 1 is a fragmentary axial cross section, partly shown in top plan view, of a shutter according to the invention illustrated attached to a camera body;

FIG. 2 is a fragmentary axial cross section of the shutter of FIG. 1 taken at a different circumferential point;

FIG. 3 is a cross section of the portion of the shutter illustrated in FIG. 2 taken in a plane normal to the optical axis;

FIG. 4 is a fragmentary axial cross section taken at the same circumferential point as FIG. 1 and showing a modification;

Figure 6:
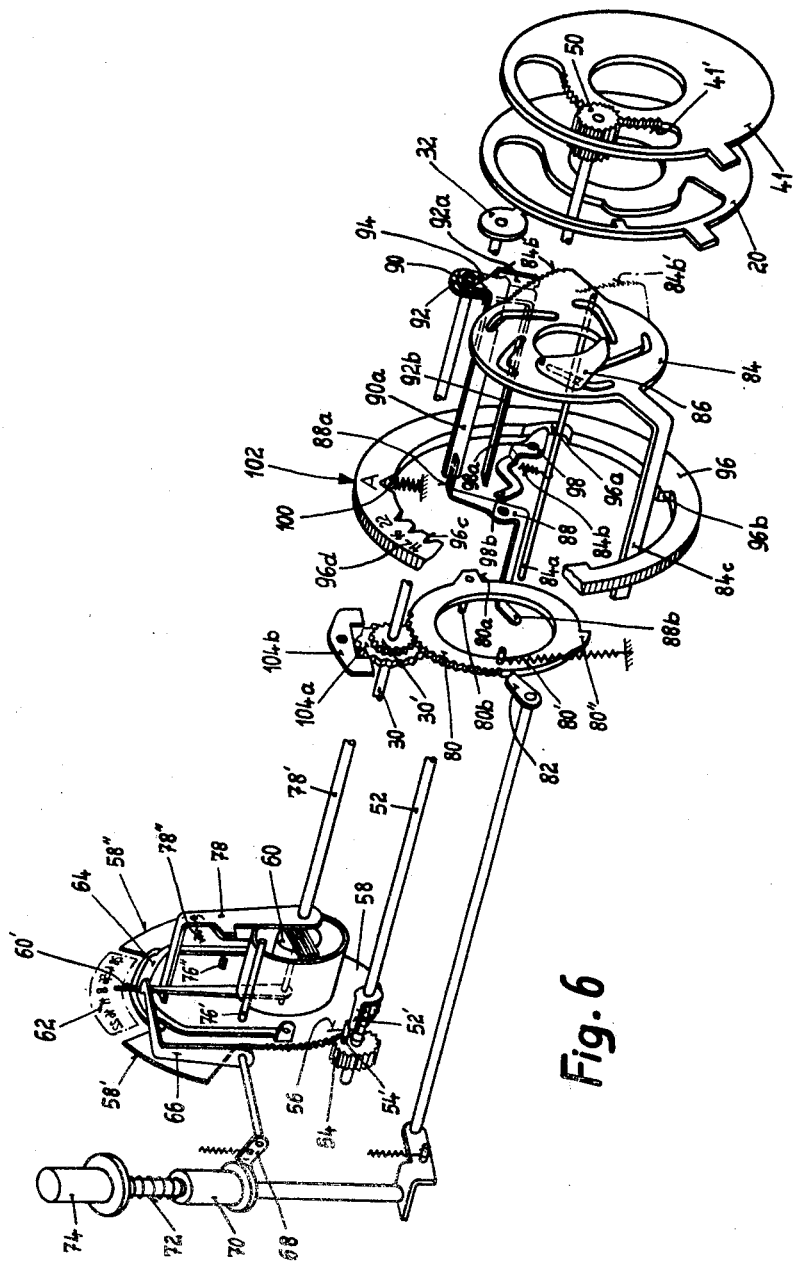
Figure 7:
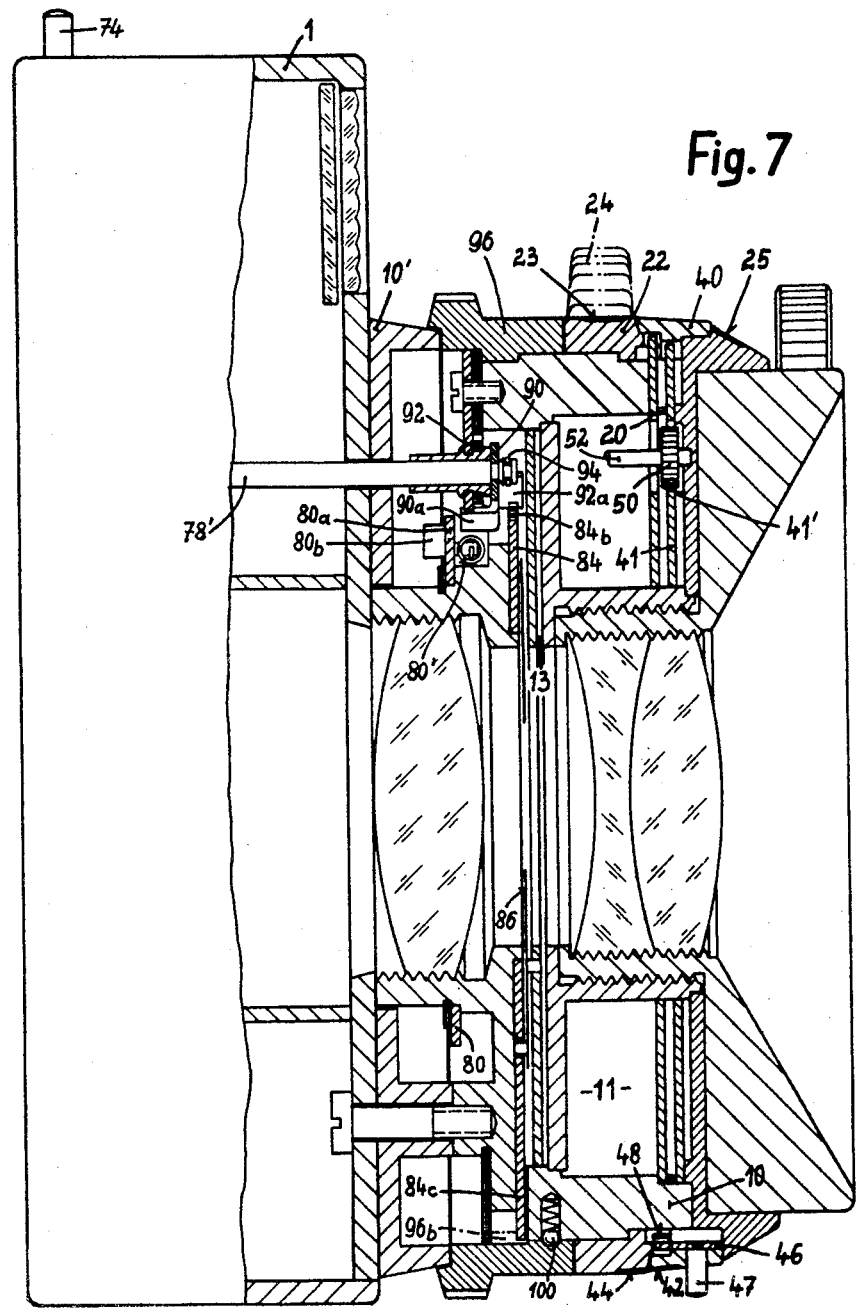

FIG. 6 is a schematic perspective view of the essential drive members of one embodiment of a shutter of the type to which the present invention is applied, here illustrated to enable a better understanding of the background of the present invention; and FIG. 7 is a view partly in elevation and partly in axial cross section, further illustrating the construction shown in FIG. 6 and the background of the present invention.

The same reference numerals throughout the several views indicate the same parts.

A first embodiment of the photographic camera according to the invention is illustrated in FIGS. 1 to 3 and 5, and includes an interchangeable objective unit and a device for opening and closing the shutter blades and the diaphragm leaves before making the exposure. These devices are advantageously used in a single lens reflex camera, and will be described with regard to such use in the preferred form. It is to be understood, however, that the shutter of the invention is applicable to cameras of other types. The preferred embodiment will furthermore be described with regard to an objective shutter of the type in which both the cocking or tensioning of the shutter and the release or triggering thereof are accomplished through a single shaft extending rearwardly from the shutter to the camera body with which the shutter is to be used. It will again be understood, however, that the device may be used with other shutter arrangements in analogous manner.

Figure 5:
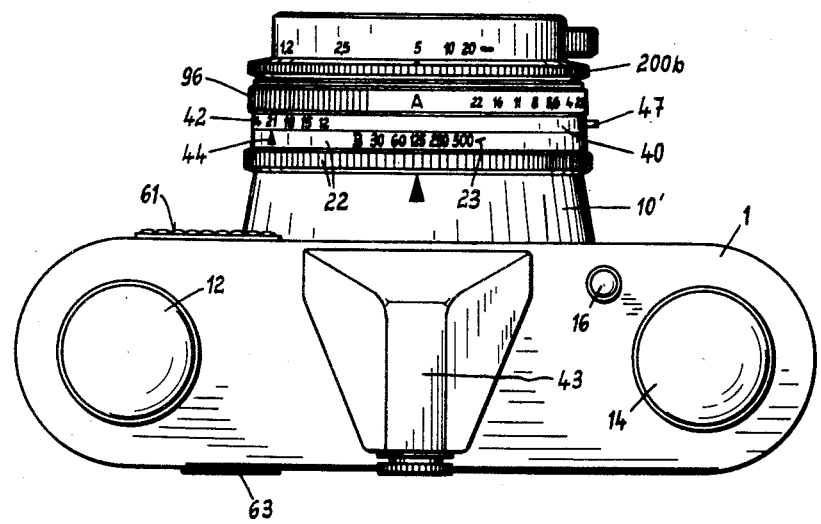
FIG. 5 is a top plan view of a camera embodying the present shutter.

Accordingly, the camera 1 shown in FIG. 5 is preferably a single lens reflex camera having a film winding knob 12, a rewind knob 14, and a shutter release 16. The film winding knob 12 is desirably of the type which cocks or tensions the shutter as the film is transported to the wind-on spool. The camera 1 also includes, though not here shown, a reflex mirror which is swung upon the film transport and cocking motion into the ray path, this mirror deflecting the beam of light and throwing it by a prism device or the like onto a viewfinder 43. This intermediate observation is necessary for focusing and composing the picture and can, of course, only be effected with the shutter blades and diaphragm leaves opened.

To the front side of the camera body 1 is fastened a mounting ring 10′ which encircles the optical axis. On this mounting ring there is mounted an objective shutter unit whose housing or casing is indicated in general at 10 (FIGS. 1–4). The principal constructional and functional features of the objective shutter correspond to a shutter described in the copending patent application of K. Gebele, Serial No. 842,145, filed September 24, 1959 (now Patent 3,044,377, granted July 17, 1962). For the sake of convenience, corresponding elements in the two structures are identified by the same reference numerals, and the reader is referred to the said copending patent application for a fuller description of their operation. However, sufficient information about the prior construction is included in the present specification to enable a full understanding of the background of the present invention.

The shutter housing 10 is integral with a rear lens tube 117 in which may be mounted one or more stationary lens elements. A shutter base plate 119 is fastened on the housing 10 for supporting the usual shutter operating or driving mechanism for operating a plurality of shutter blades 13. Since the details of the shutter blades and of the mechanism for operating the shutter blades are subject to wide variation and are unimportant so far as the present invention is concerned, the blades are shown diagrammatically and the operating mechanism has not been shown entirely. The shutter operating mechanism may, for example, take the form disclosed in British Patent 769,086 of Deckel, published February 27, 1957, or the closely similar forms disclosed in United States Patents 2,900,885 and 2,900,886, of Gebel, issued August 25, 1959. As customary in a shutter of this type, the shutter is usually cocked or tensioned by a shaft which is connected to the film winding or film transport mechanism in the camera body, so that the shutter is tensioned automatically and simultaneously when the film is advanced. The tensioning shaft is indicated fragmentarily at 30 in FIGS. 2 and 6 of the present drawings, and corresponds in function to the shaft 14 in said British patent and the second United States patent, and the shaft 20 in the first mentioned United States patent.

At the front of the annular shutter space within the shutter housing 10 is rotatably mounted a shutter speed control ring 20 having the usual timing cam slots for controlling the shutter speed. The ring 20 has a radial arm fastened for rotation with an externally mounted shutter speed setting ring 22. Bearing rotatably on the forward edges of the shutter speed control ring 22 is another ring 40 corresponding to the ring 40 in the prior application 842,145, hereafter sometimes referred to merely as the "prior application." This ring 40 may bear on its periphery a film speed scale 42 which cooperates with a reference mark 44 on the shutter speed setting ring 22. The ring 40 is coupled to the ring 22 in any one of a series of positions of relative orientation (depending on film speed) by coupling parts 46 and 48 as shown in FIG. 2 of the drawings of said prior application (reproduced as FIG. 7 of the drawings of the present application), uncoupled when desired by radially inward pressure on a manually accessible knob 47.

Since the present construction may be regarded as a modification of and improvement upon the structure of the above mentioned prior application 842,145, it will be convenient at this point to describe so much of the construction disclosed in application 842,145 as has not already been mentioned above. Referring now especially to FIGS. 6 and 7 of the present drawings (which are essentially reproductions of FIGS. 1 and 2 of the drawings of application 842,145) the already mentioned tensioning shaft 30, which lies parallel to the optical axis, is fixed to a tensioning disk 32 (corresponding to the tensioning disk 16 in the British patent) which serves to tension or cock the master member or main drive member of the shutter mechanism, and the shaft also carries a pinion 30' serving the function of the teeth 90 in the British patent, meshing with the teeth of the control ring 80 (corresponding to the control ring 76 in the British patent) to move this control ring to its tensioned position when the shaft 30 is rotated.

In front of the above mentioned shutter speed setting ring 22, there is another setting ring 40 likewise mounted concentrically about the optical axis as a center, this ring bearing on its periphery a film speed scale 42 which cooperates with a reference mark 44 on the shutter speed setting ring 22. A leaf spring 46 secured in the ring 40 has an end which engages selectively into one or another of a series of coupling notches 48 on the shutter speed setting ring 22, thus connecting the rings 22 and 40 to each other for conjoint rotation in any one of various selected positions of orientation, depending on the film speed or film sensitivity. A knob 47 secured to the leaf spring 46 and projecting radially outwardly through an opening in the ring 40, may be pressed radially inwardly to disengage the end of the spring from the notch in which it has been set, to enable the rings to be turned relatively to each other to a different position of orientation, for setting a different film speed.

The external setting ring 40 is permanently coupled to an internal setting ring 41 located within the shutter. This ring 41 has gear teeth 41' meshing with a pinion 50 fixed to a rotatable shaft 52 which extends rearwardly from the front portion of the shutter unit into the camera body. Near the rear end of the shaft 52, there is fixed thereto a driving disk 52' which is in engagement with a driving pin 54' on a pinion 54 which is rotatable on the shaft 52. A spring 56 interposed between the parts 52' and 54' urges these parts into engagement with each other.

The pinion 54 meshes with gear teeth on a supporting plate 58 rotatable in the camera body, which plate serves as a mounting plate for the measuring mechanism 60 (i.e., a moving coil galvanometer) of the photoelectric exposure meter, the photocell of which may be placed at any convenient point such as indicated schematically near the upper part of FIG. 7. It is desirable to use an exposure meter having linear characteristics, at least over that portion of the measurement range which is employed in automatically setting the exposure value. Thus if the exposure meter has linear characteristics, it can be brought into agreement with the linear shutter speed scale and film speed scale. Hence by turning the entire supporting plate 58 on which the measuring mechanism 60 is mounted, the entire measuring mechanism can be turned bodily, so that its pointer 60' can be brought into any given angular position with respect to the camera and with respect to the diaphragm aperture scale 62 arranged on a stationary and preferably transparent support, located so as to be visible through a viewing window at the rear of the camera. This bodily turning of the measuring mechanism of the meter, by turning the supporting plate 58, thus serves to introduce the variable factors of exposure time and film speed into the mechanism.

Mounted on the supporting plate 58 is a stirrup-like pivoted clamping member 64 which, when actuated by a swinging arm 66, presses against the forward face of the pointer 60' and clamps it fast against the stationary plate 58 located just to the rear of the pointer. The movement of the clamping arm 66 is effected by the camera release member 74 in the form of a plunger suitably mounted on the camera body to be depressed by the finger of the operator when it is desired to make an exposure. When the plunger 74 is depressed, this compresses a spring 72 which pushes downwardly on a slidable sleeve 70, thereby moving the arm or link 68 connected to the swinging arm 66, to cause the swinging arm to clamp the pointer 60' in a stationary position so long as the downward pressure on the plunger 74 is continued. When the plunger is released to move upwardly again, a spring connected to the link 68 moves the sleeve 70 upwardly and moves the arm 66 so that the pointer 60' is no longer clamped.

On the supporting plate 58 there are two stop pins 76' and 76" which limit the range of swinging movement of the pointer 60'. The stop pin 76' serves also as a stop for a feeler member 78 which is fixed to a rotary shaft 78' and cooperates with the pointer 60' of the exposure meter. A spring 78" tends to turn the parts 78, 78' in a counterclockwise direction and to hold them in the extreme or limit position determined by the pin 76'. (The terms "clockwise" and "counterclockwise" as used herein, refer to directions of rotary movement as seen from a position in front of the camera, looking rearwardly; that is, looking from the right side of FIG. 6 toward the left thereof.)

The supporting plate 58 has two side wings 58' and 58" in a position to swing in front of and cover part of the diaphragm aperture scale 62, when the supporting plate 58 is swung a substantial angle one way or the other from its central position.

The shutter speed scale 23, the film speed scale 42, and the diaphragm aperture scale 62 are all arranged so that there is the same angular interval between successive steps or graduations of the scales which have a complementary effect on the exposure, so that a change of one graduation in the shutter speed or in the film speed, for example, will result in a change of one graduation or step in the reading of the diaphragm aperture scale 62. It will be obvious from what has been said above that when the shutter speed adjusting ring 22 is turned to alter the shutter speed, this will turn the ring 40 with it (on account of the coupling 46) and the rotation of the ring 40 will rotate the pinion 50 and the shaft 52, thereby turning the mounting plate 58 to change the position of the pointer 60' on the diaphragm aperture scale 62, to an amount compensating for the change in shutter speed.

The present ring 80 is acted upon by a spring 80' which tends to turn the ring 80 in a counterclockwise direction to its rest or run-down position. A locking pawl 82 (corresponding, for example, to the latch 92 in the British patent) is operatively connected to the release plunger 74 and serves to drop behind a latching notch 80" on the ring 80, to hold the ring in its cocked or tensioned position until the release plunger is depressed, whereupon the locking pawl 82 is released.

Another projection 80a on the ring 80 serves, when the ring is turned in a clockwise direction, to engage an axially extending pin 84a fixed to the diaphragm control ring 84 which constitutes a diaphragm aperture adjusting member and which is rotatable about the optical axis as a center and which has the usual control slots for actuating the diaphragm leaves 86 which collectively make up an iris diaphragm. A spring 84b acting on the pin 84a tends to turn the diaphragm control ring 84 in a counterclockwise direction, to the position of minimum diaphragm aperture.

The ring 80 also has a driving pin 80b so positioned that when the ring 80 is turned in a clockwise direction from its rest or run-down position, this pin will engage an arm 88b on a swinging lever 88 mounted on a stationary pivot, and turn this lever in a counterclockwise direction on its pivot, so that the other arm 88a thereof will push against an arm 90a of a swinging lever 90 fixed to the shaft 78' of the feeler member 78, the pressure being applied in a manner to turn this shaft 78' clockwise, by the clockwise rotation of the ring 80 and the consequent counterclockwise rotation of the lever 88. Right alongside of the lever 90, there is a locking pawl 92 rotatable on the shaft 78' and having a lug 92a constituting a locking tooth. Under the action of a coil spring 94 surrounding the end of the shaft 78', the parts 90 and 92 are held in coupling engagement, with the tooth 92a resting against one edge of the locking lever 90. The locking tooth 92a, depending on the position to which it is moved by rotation of the shaft 78', lies in the path of one or another of the stepshaped notches or abutments 84b' provided on the periphery of the diaphragm control ring 84.

In an externally accessible position on the circumference or periphery of the shutter housing, there is a rotatable ring 96 having on its inner edge a cam surface 96a and a radial abutment or stop projection 96b. The cam surface 96a cooperates with one arm of a double armed lever 98 which is turnable on a fixed pivot 98a, while the second arm 98b of this lever can swing into the path of movement of the arm 92b of the locking pawl 92. The shoulder or stop projection 96b on the ring 96 extends, in certain adjusted positions of the ring, into the path of an arm 84c on the diaphragm control ring 84.

The ring 96 also has a detent of known type to hold this ring frictionally in any given position in which it has been set. For instance, a spring loaded detent ball 100 may engage in any one of a series of notches 96c successively brought opposite the ball 100 by rotation of the ring 96. On the periphery of the ring 96 there are various suitable reference marks such as the mark "A" and a diaphragm aperture scale 96d, which cooperates with a stationary index mark 102.

This ring 96 serves as a switching member or controlling member to determine whether the diaphragm aperture is to be set automatically or manually, and if set manually, to determine at what aperture it is to be set. When the camera is to be used for automatic diaphragm setting, the ring 96 is turned to the position where the mark "A" lies opposite the mark 102. In this normal rest position, the cam surface 96a is inactive, so that the arm 98b of the lever 98 is out of the path of the arm 92b of the locking pawl 92 (the lever 98 being swung to this inactive position by a spring, not shown) and at the same time the stop shoulder 96b of the ring 96 lies beyond the range of movement of the arm 84c on the diaphragm control ring 84. Hence these parts do not interfere in any way with the intended motion of the pawl 92, which can move, with the rotation of the shaft 78', to any position determined by the engagement of the feeler 78 with the pointer 60' of the exposure meter. The locking pawl 92 partakes of the movement of the shaft 78' because the spring 94 tends to keep it in a given position with respect to the lever 90 which is fixed to the shaft 78'.

When the appropriate mechanism on the camera body (e.g., the film feeding or advancing mechanism) is operated to turn the tensioning shaft 30, the control ring 80 is also turned in a clockwise direction, and the portion 80a thereon will enage and carry with it the pin 84a on the diaphragm control ring 84, thereby moving it to its limit position in a diaphragm opening direction (position shown in dotted lines in FIG. 6) to open the diaphragm to maximum aperture. During this cocking or tensioning motion, the pin 80b on the control ring 80 also engages the arm 88b of the lever 88 and swings the latter in a counterclockwise direction so as to engage the portion 90a of the lever 90 and swing it and the shaft 78' clockwise. This clockwise movement of the lever 90 causes (through the spring 94) corresponding clockwise swinging of the stop pawl 92 until it comes to rest on the base circle of the diaphragm control ring 84. The clockwise turning of the arm 90 and shaft 78' also causes clockwise swinging of the feeler member 78 to its starting or initial position, ready to perform a feeling operation on the pointer 60' of the light measuring instrument.

Thus when cocking or tensioning the shutter mechanism (and simultaneously feeding the film, as disclosed for example in either of the United States patents above mentioned) the operator need merely see to it that the shutter speed is set to an appropriate value by rotation of the ring 2, and that the film speed ring 40 is properly set to reflect the speed of the film being used. Any rotation of the ring 40 (either by itself, or jointly with the ring 22) will turn the shaft 52, as above explained, and rotate the mounting plate 58 on which the light measuring instrument 60 is mounted, to vary bodily the position of the measuring instrument in accordance with the selected shutter speed and film speed. Then after the measurement of the light has been effected by the exposure meter in known manner, the pointer 60' of the exposure meter assumes a deflected position which indicates on the scale 62 the stop or diaphragm aperture which can subsequently be set by the automatic mechanism. If the pointer 60' does not appear in the field of the diaphragm scale (or that portion thereof which is not obscured by one or the other of the wings 58' and 58") this means that a diaphragm aperture corresponding to the previously selected shutter speed and film speed cannot be reached by the automatic mechanism. In such a case the operator must change the manually selected factors, as for example by changing the selected shutter speed, which will turn the measuring instrument until a possible diaphragm aperture value is indicated on the scale 62. For instance, in the position shown in FIG. 6, the pointer 60' indicates on the scale 62 that the required stop or diaphragm aperture is "8" and this can be set by the automatic mechanism.

After first making sure that an automatic setting is possible (by observing the position of the pointer 60' on the scale 62) the operator now depresses the release plunger 74. At the start of the downward movement of the plunger, the pointer 60' will be clamped stationary in the position which it had reached at that time. Then, upon further downward movement of the plunger, the pawl or latch 82 will be released, allowing the spring 80' to turn the control ring 80 in a counterclockwise direction. The control ring now starts to run down toward its rest position, this return motion being slowed down by suitable retarding mechanism such as the star wheel 104a fixed to the shaft 30, engaged by a vibrating pallet or anchor 104b. The slowing down of the return movement assures smooth operation, without excessive jar or vibration when one of the moving parts engages another, and prevents the parts from reaching such high velocity during the running down movement that there would be a serious rebound or possible damage at the end of the running down movement.

During this running down or return movement of the control ring 80, the parts 80a and 80b respectively release the parts 84a and 88b, so that the spring 78" is able to move the feeler 78 and the shaft 78' until the feeler comes into contact with the clamped pointer 61' of the measuring instrument. This rotation of the shaft 78' to a rotary position controlled by the exposure meter moves the tooth 92a to a position to cooperate with the proper one of the stepped abutments 84b' corresponding to the diaphragm aperture to be set. Simultaneously the release of the part 84a by the portion 80a of the control ring, allows the spring 84b to turn the diaphragm ring 84 in a counterclockwise direction until further counterclockwise movement is stopped by engagement of one of the steps 84b' with the tooth 92a, whereupon the further rotation of the ring 84 in a diaphragm-closing direction is stopped, and the diaphragm is set to the proper aperture, in this case the aperture f/8. Thus the steps 84b' on the adjusting member 84, in combination with the tooth 92a and the parts (90, 78', 78, etc.) which control the tooth, collectively constitute blocking mechanism for blocking return movement of the aperture adjusting member 84. This blocking mechanism may be regarded as comprising a first part (members 78, 78', 90) resiliently coupled by the spring 94 to a second part (members 92, 92a, 92b). The tooth 92a may be considered as an abutment or abutment arm engageable with the stepped abutments 84b' on ring 84, the position of the tooth upon engagement being dependent on the adjusted position of the shaft 78' and the other or first arm 94.

Since this setting movement of the locking tooth 92a from its tensioned position to the position controlled by the feeler 78 is a movement in a direction from the optical axis outwardly, and since the steps 84b' on the diaphragm control ring 84 also progress (when the ring turns in a running down direction) from the optical axis outwardly, there is no danger of the tooth 92a missing the proper stop or abutment that it is supposed to engage. The parts can be so proportioned that the running down movement of the ring 84 follows very closely the movement of the tooth 92a and the shaft 78'. In other words, it is not necessary to delay the movement of the ring 84 substantially behind the movement of the shaft 78', nor to hold the ring 84 until the tooth 92a has been fully positioned, before allowing the ring 84 to begin to rotate. On the contrary, the present invention promotes speedy action of the parts, without danger of erroneous setting.

The first step of the stepped abutment 84b', starting at the base circle, corresponds to the largest diaphragm aperture of which the construction is capable; for example, in the illustrated embodiment, an aperture of f/2.8.

If it is desired to set the diaphragm aperture manually rather than automatically (for instance, when taking flash photographs) the switch ring 96 is moved in a clockwise direction from the automatic switch position "A." It can now be set to any desired diaphragm aperture, using the diaphragm aperture scale 96d in conjunction with the reference point 102. When this ring 96 is set to a selected diaphragm aperture position, the stop shoulder 96b engages the arm 84c of the diaphragm control ring 84 and holds the latter, upon running down from the extreme tensioned position, in the desired diaphragm aperture position. The movement of the ring 96 away from the automatic position also causes the cam surface 96a thereon to swing the locking lever 98 in a clockwise direction on its pivot, so that the arm 98b thereof engages the arm 92b on the locking tooth 92a, and swings this tooth against the force of the spring 94, to keep the tooth out of the path of the steps 84b', although still allowing the shaft 78' and the lever 90 to turn. In other words, the lever 98 serves to break or render ineffective the resilient coupling between the stop tooth 92a and the lever 92. The feeler 78, shaft 78' and lever 90 still carry out their same normal movements, just as in the case of automatic setting, but these movements do not cause the locking tooth 92a to determine the position of the diaphragm control ring 84.

The exposure meter is controlled by the usual photocell or photoelement which receives light through the window 61 (FIG. 5) in the front wall of the camera body 1. The pointer 60' of the exposure meter is visible through a window 63 (FIG. 5) in the rear wall of the camera body.

In the preferred form of the present invention, the shutter mechanism and the diaphragm mechanism are divided in such fashion that the shutter blades and their operating parts are in one unit permanently mounted on the camera body while the diaphragm leaves and part of their operating mechanism are mounted in a separate unit carrying some or all of the lens elements or components, this separate unit being detachably and interchangeably mounted on the camera body. Both units may be collectively referred to as the shutter assembly.

The stationary portion of the objective shutter assembly includes a bayonet ring 204 disposed forwardly of the shutter speed control ring 20 and fastened at its outer edge to the shutter housing 10 and extending inwardly, in stepwise fashion. Mounted on the bayonet ring 204 and projecting forwardly is a stationary mounting ring 204b at the outer edge of which bears rotatably a diaphragm shift ring 96. This ring 96 bears at its rear edge on the ring 40, and its purpose will be explained later. The rings 22 and 40 bear for rotation on the stationary ring 204.

The interchangeable lens and diaphragm unit of the shutter has a divided mount 200a, 200b between which is rotatably mounted a diaphragm control ring 202. The diaphragm control ring 202 is operatively connected to a plurality of diaphragm leaves, not here shown, appropriately mounted on the interchangeable unit. At the rear of the mount part 200a, are a plurality of radially extending bayonet slots 200c which cooperate in a well known manner with the corresponding circumferentially spaced projections 204a on the permanently mounted bayonet ring 204. It is evident that the interchangeable unit is inserted into the stationary shutter unit oriented such that the slots 200c pass over the lugs 204a, the mount thereafter being rotated bearing against the rings 204 and 204b to disaline the slots 200c from the lugs 204a. Removal of the interchangeable unit is accomplished in the reverse manner.

The previously mentioned shutter tensioning shaft 30 is disposed approximately parallel to the optical axis and extends through apertures in the shutter housing 10 and the shutter base plate 119 forwardly into the annular shutter cavity. The shaft 30 is rotatable in a bushing 10a fixed in the shutter housing 10, and the rear end of the shaft 30 has a flat portion for securing a hub 208 for rotation with the shaft 30 while bearing forwardly against the end of the bushing 10a. A pinion 30' is fixed for rotation with the hub 208 and shaft 30 and is in meshing engagement with a tensioning or cocking ring 80 mounted rotatably on the rear lens tube 117.

The tensioning ring 80 has a radial arm 80a which is engageable with an axially extending pin 84a carried by an auxiliary diaphragm control ring 84 mounted rotatably on the shutter housing 10. Upon tensioning the shutter, the pinion 30' rotates the ring 80, and the projection 80a engages the pin 84a to turn the auxiliary diaphragm control ring 84 about the optical axis as a center to a position of maximum aperture. A spring 84b acting on the pin 84a tends to turn the auxiliary diaphragm control ring 84 in the opposite counterclockwise direction, to the position of minimum diaphragm aperture.

Motion of the auxiliary diaphragm control ring 84 in the shutter unit in accordance with the invention is transferred or transmitted to the diaphragm control ring 202 in the interchangeable objective unit. To accomplish this, a pinion 120a secured to the rear end of a shaft 120 is in meshing engagement with the outer toothed periphery of the ring 84. The shaft 120 extends axially and is journaled for rotation in an aperture in the shutter housing 10. At the other forward end of the shaft 120 is another pinion 120b which is in meshing engagement with the outer toothed periphery of a driving or transfer ring 122. The ring 122 is mounted for rotation about the optical axis in a groove formed between the stationary rings 204 and 204b. The transfer ring 122 has a radially and axially extending projection or arm 122b which projects forwardly to be engageable with the rearwardly turned entraining end portion of a radial arm 202b on the diaphragm control ring 202. The arms 122b and 202b have circumferential travel, as their respective rings 122 and 202 rotate, in an arcuate annulus formed between the mount parts 200a and 200b on the interchangeable unit and the stationary ring 204b on the shutter unit.

By this arrangement, rotational adjustment of the auxiliary diaphragm control ring 84 is transmitted to the pinion 120a, and through the shaft 120 to the pinion 120b to adjust transfer ring 122 to a corresponding angular position. A spring 202a urges the diaphragm control ring 202 in a counterclockwise direction toward a position of minimum diaphragm aperture. The arm 202b is disposed clockwise of the arm 122b and thus is urged by the spring 202a constantly into engagement with the arm 122b. It will be recalled that upon tensioning the shutter, the tensioning ring 80 is turned in a clockwise direction until latched at an end position by a pawl similar to the pawl 82 in the aforementioned copending patent application Serial No. 842,145. Consequently, in the tensioned position of the shutter, the arm 80a engages the pin 84a to hold the auxiliary diaphragm control ring 84 in an extreme clockwise position, the transfer ring 122 also being moved to this position and, through the engagement of the arm 122b with the arm 202b, the diaphragm control ring 202 is moved to an extreme clockwise maximum aperture position against the force of the spring 202a.

Upon releasing the shutter by depressing the shutter release plunger 16, the previously mentioned locking pawl unlatches the tensioning ring 80 for running down movement in a counterclockwise direction under the action of a spring 80'. As the arm 80a swings in a counterclockwise direction, the auxiliary diaphragm control ring 84 follows along under the action of its spring 84b, which tends to turn the ring 84 also in a counterclockwise direction. Running down movement of the ring 84 is limited at the approximate diaphragm aperture position by the engagement of one of a series of radially rising steplike abutments 84b' carried by the ring 84, with a locking tooth 92a having a radial position dependent upon the diaphragm aperture to be set. The locking tooth is operatively connected (as shown in the prior application) to the feeler member 78 of an exposure meter. As is more fully explained there, the feeler swings to move the stop tooth 92a radially inward toward a position of smaller diaphragm aperture, until the feeler engages the pointer 60' of the exposure meter. The pointer has meanwhile been clamped in place in a position corresponding in part to the brightness of the object to be photographed, and in part to the shutter speed and film speed for which the mechanism has been set. As the auxiliary diaphragm control ring 84 is stopped at an intermediate position in its running down movement toward minimum aperture by the engagement of one of the abutments 84b', the transfer ring 122 is stopped at a corresponding angular position, as is the diaphragm control ring 202. Thus the diaphragm leaves 86 are positioned by the ring 202 to the appropriate diaphragm aperture. In the prior application, the diaphragm leaves 86 are operated directly by the ring 84, but in the present application the diaphragm leaves are operated directly by the ring 202, the angular position of which is dependent upon that of the ring 84.

The diaphragm shift ring 96 makes provision for manually setting the diaphragm aperture to a selected value, rather than by the automatic locking mechanism associated with an exposure meter which has been described. For this purpose, the ring 96 has a radial stop surface 96b which is engageable with the arm 202b on the ring 202 when the ring 96 is shifted in a clockwise direction. In this case, running down of the ring 202 from a maximum diaphragm aperture position is limited by the engagement of the arm 202b with the stop surface 96b, while the arm 122b continues to run down beyond this stopping position. When the diaphragm shift ring 96 is in an automatic position, however, the stop surface 96b is angularly out of the range of movement of the arm 202b, and is ineffective to limit the running down movement of the diaphragm control ring 202. This is more fully explained in the foregoing description of the structure illustrated in FIGS. 6 and 7, taken essentially from said copending application Serial No. 842,145.

In attaching the interchangeable objective unit to the stationary portion of the shutter carrier by the camera body 1, the interchangeable unit is given a left hand twist in a counterclockwise direction as viewed from the direction of the arrow A in FIG. 1. The arm 202b is twisted into contact with the stationary arm 122b which will therefore intercept the diaphragm control ring 202 and energize its associated spring 202a in such manner as to adjust the diaphragm in the interchangeable objective unit in accordance with the position of the automatic diaphragm control mechanism when the interchangeable unit is twisted into position. For instance, assuming that the interchangeable unit is mounted when the automatic mechanism is in its tensioned position, then the diaphragm will be opened from minimum to maximum aperture. On the other hand, if the diaphragm shift ring 96 is in a position for manually setting the diaphragm to a selected value, then arm 202b will be retained by the stop surface 96b in a position which corresponds with the preselected diaphragm aperture, when the interchangeable objective unit is twisted into position.

The left hand twisting in motion which has been described is contrary to the normal right hand twist given to the conventional interchangeable objective units when they are being mounted. However, right hand twists can be retained, if desired, without causing undue difficulty. This may be accomplished by interposing a motion reversing pinion, not here shown, for instance between pinion 30' and tensioning ring 80, and if the automatic diaphragm control mechanism and feeler device described in connection with FIGS. 6 and 7 are arranged to work in the opposite direction.

The foregoing interchangeable unit and built-in automatic diaphragm device need not necessarily be associated with a camera of the single lens reflex type. When mounted on a single lens reflex camera, however, the shutter blades 13 must be opened for viewing and observation, and closed again before making the exposure. In accordance with the invention, this is achieved in a simple manner by arranging the auxiliary device for opening and closing the shutter blades on the tensioning shaft 30 of the shutter. It has previously been mentioned that the pinion 30' is fixed to a hub 208 secured for rotation with the tensioning shaft 30 and bearing against the bushing 10a. A ratchet or star wheel 104a is likewise fixed for rotation with the hub 208 and engages an escapement anchor 104b in well known manner to retard the running down movement of the tensioning ring 80 and also the auxiliary diaphragm ring 84. The anchor 104b is pivoted on a pin 121 secured to the shutter housing 10. Between the pinion 30' and the ratchet wheel 104a on the hub 208 is mounted on actuating disk 206, the three parts 30', 206, and 104a forming a unit with the bushing 208 to rotate together.

Mounted on the shutter base plate 119 for rotation about the optical axis is a shutter blade operating ring 212 operatively connected to the shutter blades 13 to actuate their opening and closing in well known manner. The ring 212 may correspond to the ring 40 in U.S. Patent 2,900,886, and to the ring 32 in the copending U.S. patent application of K. Gebele and E. Spiessl, Serial No. 778,663, filed December 8, 1958 (now Patent 3,044,382, granted July 17, 1962). The ring 212 has a radially projecting arm 212b having a circumferential portion at its end which bears an axially extending pin 212a. For opening and closing the shutter blades to make an exposure, the blade ring 212 is rotated first in one direction and then in the opposite direction by the usual master member, not here shown, but shown at 18 in said Patent 2,900,886 and at 34 in said application 778,663. But other or auxiliary mechanism, somewhat like that shown in application 778,663, is used for opening the shutter blades for focusing or viewing, the master member not being employed for this purpose.

Loosely embracing the bushing 10a, between the pinion 30' and the shutter housing 10, is a coupling member 210. The coupling member 210 has two radial arms 210a and 210b spaced circumferentially from one another and disposed on opposite sides of the rearward projection of the pin 212a. The arms 210a and 210b are alternately engageable with the pin 212a on the shutter blade control ring 212. A spring 214 surrounds bushing 10a and has one end 214a bearing against a projection 210' on the coupling member 210, whereas the other end 214b of the spring bears against another projection 210'' on the coupling member 210. The projections 210' and 210'' extend rearwardly and are preferably spaced circumferentially less than 180 degrees. A forwardly extending arm 206a on the actuating disk 206 projects forwardly into the path of motion of the spring 214 near the end 214b, and is adapted to entrain the end 214b of the spring 214 of the coupling member 210 during counterclockwise motion of the actuating disk 206. The coupling member 210 has a return spring 210c tending to constantly urge the coupling member 210 in clockwise direction.

The operation of the auxiliary shutter blade opening and closing device is that rotation of the tension shaft 30 during tensioning of the shutter carries along the actuating disk 206 in a counterclockwise direction to bring the arm 206a of the disk into contact with the end 214b of the spring 214 to cause the coupling member 210 ot turn also in a counterclockwise direction. The radial arm 210a on the coupling member 210 strikes against the pin 212a to carry along the shutter blade control ring 212 in a counterclockwise direction, to open the shutter blades 13. Upon release of the shutter, the tensioning shaft 30 along with the actuating disk 206 rotate in the reverse clockwise direction. The coupling member 210 follows along in a clockwise direction since the return spring 210c tends to maintain engagement with the rotating arm 206a, as a result of which the other radial arm 210b on the coupling member 210 strikes against the pin 212a to rotate the shutter blade control ring 212 back in a clockwise direction.

The combination of pinion 30', actuating disk 206, ratchet wheel 104a and bushing 208 in a unit assembly has the advantage of providing a compact space-saving arrangement which facilitates assembling the camera. The interposition of spring 214 between the actuating disk 206 and the coupling member 210 has the further advantage of permitting the kinematic engagement of arm 210'' and spring end 214b during the opening operation to be temporarily broken so that, for instance, the shutter blades and their mountings cannot be damaged if the opening mechanism is operated when the shutter is not in a suitable operational position.

In FIG. 4 is illustrated a modification of the interchangeable unit and automatic diaphragm setting mechanism of FIG. 1. The principal constructional and functional features of FIG. 4 correspond with the camera described more particularly in FIG. 3 of the copending patent application Serial No. 842,145, but it is sufficiently similar to the construction in FIGS. 1 and 2 of the copending application and described in connection with FIGS. 6 and 7 of the present application, so that those skilled in the art will have no difficulty in understanding this modification now to be described. In this embodiment of the invention completely automatic setting of the shutter speed as well as the diaphragm aperture, may be effected, in addition to a manual setting of each factor. In this fully automatic form of the invention, the automatic diaphragm mechanism is so connected with the shutter speed setting device that a given time of exposure or shutter speed is normally associated with a given diaphragm aperture. For example, for an exposure value of 18, a shutter speed of 1/500 of a second may be associated with a diaphragm aperture of f:22, and for progressively lower exposure values, there are progressively slower shutter speeds and progressively larger diaphragm apertures, until there is reached a shutter speed of 1/30 of a second and a diaphragm aperture of f:2.8 for an exposure value of 8.

The interchangeable unit again comprises the mount parts 200a and 200b between which is rotatably mounted the diaphragm aperture control ring 202, urged in a counterclockwise direction to a position of minimum aperture by the spring 202a. Mounted rotatably about the periphery of the stationary portion of the shutter unit are the diaphragm shift ring 96, and in addition a shutter speed shift ring 114. As before, the diaphragm shift ring has a stop surface 96b which is engageable with the rearwardly turned arm 202b of the ring 202 for manually setting a preselected diaphragm aperture. In similar fashion, the shutter speed shift ring 114 has a radial stop surface 114a which is engageable with a forwardly turned arm 20m of the shutter speed control ring 20. By moving the ring 114 from an automatic to a manually set position, various internally timed shutter speeds may be set manually on the shutter.

The arm 20m of the ring 20 is engaged by the radial arm 122b on the transfer ring 122, as a spring 110 acts on the shutter speed control ring 20 tending to constantly turn the ring 20 in a counterclockwise direction, from the position of longest internally-timed exposure toward the position of shortest exposure. The ring 122 in this embodiment shown in FIG. 4, just as in the earlier embodiment of FIG. 1, is operated by the connection 120, 120a, 120b from the ring 84, which in turn is operated by the ring 80. Thus when the shutter is tensioned to make it ready for an exposure, the clockwise rotation of the ring 80 causes corresponding clockwise rotation of the ring 122, so that the arm 122b thereof, engaging the arms 20m and 202b of the rings 20 and 202, respectively, causes corresponding clockwise rotation of these rings to their desired limit positions, e.g., the respective positions of slowest internally timed shutter speed and largest diaphragm aperture.

Upon subsequent release of the shutter, the ring 80 runs down in a counterclockwise direction, under the influence of its spring 80' at a speed controlled by the escapement 104a, 104b, and the ring 84 follows along with it until stopped by engagement of the exposure-meter-controlled tooth 92a with one of the steps 84b' on the ring 84, all as described in said prior application 842,145. The corresponding counterclockwise movement of the ring 122 causes the arm 122b to serve as a stop or abutment to stop the counterclockwise running-down movement of the rings 20 and 202. In their stopped positions, the rings 20 and 202 have related positions for the particular exposure value indicated.

Should the diaphragm shift ring 96 be moved out of its automatic position to a manually set diaphragm aperture position, the running down movement of the diaphragm control ring 202 is arrested by the abutment of the arm 202b against the radial stop surface 96b. In a similar fashion, in the case that the speed shift ring 114 is moved out of its automatic position to a manually set shutter speed position, running down movement of the arm 20m is now arrested by abutting against the radial stop surface 114a.

The mounting of the interchangeable unit is again accomplished by a left hand or counterclockwise twist as viewed from the direction of the arrow A in FIG. 1. During the twisting, the arm 202b on the ring 202 will engage the radial arm 122b or the arm 96b (whichever one of these arms is in the more clockwise position) and the effective one of these arms will act as a stop or abutment to position the ring 202 (at the conclusion of the twisting movement) and the diaphragm leaves at whatever aperture is called for by the position of the arm 122a or the arm 96b, respectively. When the shift ring 96 is in its usual position for automatic setting, the arm 96b will be retracted counterclockwise to its limit position and it will be the arm 122b which will normally control the size of the diaphragm aperture.

In the arrangement according to the present invention, all the mechanisms which cooperate in adjusting the camera with reference to an exposure value, and which control release and exposure, are associated with the shutter unit and combined in a single precision-built structural unit. A shutter unit so designed forms the heart of the camera and permits the mechanisms in the camera body, and possibly the mechanisms in the interchangeable objective unit, to be coupled therewith during assembly or when the interchangeable unit is mounted. Simplicity of manipulation and convenience of the general dispositions are combined with functional reliability.

It may be mentioned that the camera or shutter assembly need not comprise all the assemblies that have been described. For instance, a single lens reflex camera constructed as herein described may be provided with a permanently mounted objective, in which case the diaphragm assembly may likewise be conveniently associated with the shutter assembly. Moreover, the several structural assemblies may be coupled in different ways.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising an objective mounting unit having an optical axis, an interchangeable lens and diaphragm unit attachable to and detachable from said mounting unit, interengageable means on said two units for removably securing them to each other, a diaphragm control member mounted rotatably on said interchangeable unit and having an entraining member projecting therefrom, spring means for urging said diaphragm control member toward a minimum aperture position, diaphragm control mechanism mounted on said mounting unit, said diaphragm control mechanism including an auxiliary diaphragm control ring mounted for rotation about the optical axis, spring means tending to urge said auxiliary diaphragm control ring toward a minimum aperture position, means for moving said auxiliary diaphragm control ring to an initial maximum aperture position, said auxiliary diaphragm control ring being adapted to be stopped during its running down movement at a variable position corresponding to an appropriate aperture setting, and a projection mounted rotatably on said mounting unit and operatively connected to said auxiliary diaphragm control ring for movement therewith in the path of motion of said entraining member on said interchangeable unit to move said diaphragm control ring to a corresponding aperture position, said entraining member moving into contact with said projection when said interchangeable unit is fitted to said mounting unit.

2. A construction as defined in claim 1, wherein said diaphragm control member is a ring and said entraining member is an arm thereon, and said projection is carried by a ring coupled for movement with said auxiliary diaphragm control ring.

3. A photographic camera comprising an objective mounting unit having an optical axis, an interchangeable lens and diaphragm unit attachable to and detachable from said mounting unit, interengageable means on said two units for removably securing them to each other, a diaphragm control ring mounted rotatably on said interchangeable unit and having an entraining arm projecting rearwardly therefrom, spring means for urging said diaphragm control ring toward a minimum aperture position, diaphragm control mechanism mounted on said mounting unit, said diaphragm control mechanism including an auxiliary diaphragm control ring, spring means for urging said auxiliary diaphragm control ring toward a minimum aperture position and other means for moving said auxiliary diaphragm control ring to an initial maximum aperture position, said auxiliary diaphragm control ring being adapted to be stopped during its running down movement at a variable position corresponding to an appropriate aperture setting, a transfer ring mounted rotatably on said mounting unit, means for coupling said transfer ring and said auxiliary diaphragm control ring for rotational movement together, and a projection on said transfer ring movable in the path of motion of said entraining arm to move said diaphragm control ring on said interchangeable unit to a corresponding aperture position as said auxiliary diaphragm control ring, said entraining member moving into contact with said projection when said interchangeable unit is fitted to said mounting unit.

4. An objective shutter for a photographic camera comprising a plurality of shutter blades and a rotatable shutter blade control ring for opening and closing said shutter blades, a rotatable diaphragm control ring and a diaphragm control mechanism for positioning said diaphragm control ring, said diaphragm control mechanism including an auxiliary diaphragm control ring which is biased for running down movement from an initial maximum aperture position to a minimum aperture position, characterized by an auxiliary shutter blade opening and closing device for operating the shutter blades for preliminary viewing prior to making an exposure, said device being mounted on a shutter tensioning shaft, and means including a member mounted on said tensioning shaft for moving said auxiliary diaphragm control ring to its maximum aperture position, said tensioning shaft being rotatable to simultaneously actuate said auxiliary device to open the shutter blades and to move said auxiliary diaphragm ring to its maximum aperture position.

5. A photographic camera comprising an objective shutter unit, an interchangeable lens and diaphragm unit attachable to and detachable from said shutter unit, interengageable means on said two units for removably securing them to each other, said shutter unit including a plurality of shutter blades and a rotatable shutter blade control ring for opening and closing said shutter blades, an auxiliary shutter blade opening and closing device engageable with said blade control ring for operating the shutter blades for preliminary viewing prior to making an exposure, a diaphragm control member mounted rotatably on said interchangeable unit and having an entraining member projecting therefrom, diaphragm control mechanism mounted on said shutter unit, said diaphragm control mechanism including an auxiliary diaphragm control ring which is biased for running down movement from an initial maximum aperture position to a minimum aperture position, said auxiliary diaphragm control ring being adapted to be stopped during its running down movement at an appropriate aperture setting, a projection mounted rotatably on said shutter unit and operatively connected to said auxiliary diaphragm control ring for movement therewith in the path of motion of said entraining member on said interchangeable unit to move said diaphragm control ring to a corresponding aperture position, said entraining member moving into contact with said projection when said interchangeable unit is fitted to said shutter unit, and an operating member in the shutter unit for jointly driving the auxiliary shutter blade opening and closing device for preliminary viewing and for moving said auxiliary diaphragm control ring and coupled projection into maximum aperture position.

6. A construction as defined in claim 5, wherein said operating member comprises a tensioning shaft to which are fixed a pinion and an actuating disk, said pinion meshing with a tensioning ring coupled with said auxiliary diaphragm control ring to move said auxiliary diaphragm control ring to maximum aperture position upon rotation of said tensioning shaft in a shutter tensioning direction, said actuating disk being engageable with said auxiliary device for simultaneously opening the shutter blades.

7. A construction as defined in claim 6, wherein said auxiliary device includes a coupling member mounted rotatably on said tensioning shaft and having radial arms alternately engageable with said blade control ring, a spring extending between two portions of said coupling member, and a projection on said actuating disk engageable with said spring to drive said coupling member.

References Cited in the file of this patent
UNITED STATES PATENTS

| | | |
|---|---|---|
| 2,340,573 | Aiken | Feb. 1, 1944 |
| 2,380,610 | Pignone | July 31, 1945 |
| 2,480,973 | Schwarz | Sept. 6, 1949 |
| 2,701,992 | Gorey | Feb. 15, 1955 |
| 2,926,575 | Gebele | Mar. 1, 1960 |
| 2,943,551 | Gebele | July 5, 1960 |